US012168238B2

(12) United States Patent
Rooke et al.

(10) Patent No.: US 12,168,238 B2
(45) Date of Patent: Dec. 17, 2024

(54) CENTRIFUGE APPARATUS WITH CONNECTABLE MEANS WITH A FLYING LEAD ASSEMBLY

(71) Applicant: Dynamic Extractions Limited, Torfaen (GB)

(72) Inventors: David Rooke, Torfaen (GB); Colin Bright, Torfaen (GB)

(73) Assignee: Dynamic Extractions Limited, Blaeunau Gwent (GB)

( * ) Notice: Subject to any disclaimer, the term of this patent is extended or adjusted under 35 U.S.C. 154(b) by 840 days.

(21) Appl. No.: 17/278,946

(22) PCT Filed: Oct. 16, 2019

(86) PCT No.: PCT/GB2019/052936
§ 371 (c)(1),
(2) Date: Mar. 23, 2021

(87) PCT Pub. No.: WO2020/079421
PCT Pub. Date: Apr. 23, 2020

(65) Prior Publication Data

US 2022/0032324 A1 Feb. 3, 2022

(30) Foreign Application Priority Data

Oct. 19, 2018 (GB) ...................................... 1817033

(51) Int. Cl.
*B04B 15/02* (2006.01)
*B04B 5/04* (2006.01)

(52) U.S. Cl.
CPC ............ *B04B 15/02* (2013.01); *B04B 5/0442* (2013.01)

(58) Field of Classification Search
CPC .......... B04B 15/02; B04B 5/0442; B04B 5/02
See application file for complete search history.

(56) References Cited

U.S. PATENT DOCUMENTS 4,792,395 A * 12/1988 Lee .................... G01N 30/6047 210/657

FOREIGN PATENT DOCUMENTS

| | | | | | |
|---|---|---|---|---|---|
| CN | 102822340 | A | * | 12/2012 | ............. B01D 15/22 |
| CN | 106823464 | A | * | 6/2017 | ............. B01D 15/22 |
| EP | 2760589 | | | 4/2013 | |
| ES | 2521682 | T3 | * | 11/2014 | ............. C12N 15/86 |
| ES | 2658149 | T3 | * | 3/2018 | ................ B01L 9/06 |
| WO | 2006045993 | | | 5/2006 | |
| WO | WO-2006045993 | A1 | * | 5/2006 | ............. G01N 30/42 |
| WO | 2009008103 | | | 1/2009 | |
| WO | WO-2009008103 | A1 | * | 1/2009 | ......... B01D 15/1807 |
| WO | 2013045943 | A2 | | 4/2013 | |

* cited by examiner

*Primary Examiner* — Walter D. Griffin
*Assistant Examiner* — Shuyi S. Liu
(74) *Attorney, Agent, or Firm* — Gable Gotwals

(57) ABSTRACT

Apparatus used to allow separation of one or more components from a liquid supplied to the apparatus and then, following use of the apparatus, the one or more separated components can be used for further purposes. The apparatus includes a rotatable shaft to which is mounted one or more columns which rotate with the shaft and which also rotate about their own axes and through which the liquid passes. The columns are provided with liquid from flying lead assemblies and the invention provides improved connecting means between the columns and flying lead assemblies to allow the same to be modular. An improved cooling system is also disclosed.

14 Claims, 2 Drawing Sheets

CENTRIFUGE APPARATUS WITH CONNECTABLE MEANS WITH A FLYING LEAD ASSEMBLY

CROSS-REFERENCE TO RELATED APPLICATIONS

This United States application is the National Phase of PCT Application No. PCT/GB2019/052936 filed 16 Oct. 2019, which claims priority to British Patent Application No. 1817033.2 filed 19 Oct. 2018, each of which is incorporated herein by reference.

The invention to which this application relates is apparatus which is used to allow the separation of one or more components from a liquid which is supplied to the apparatus and then, following use of the apparatus, the one or more separated components can used for further purposes.

Apparatus of this type is known and the Applicant, in their co-pending patent application EP2760589 describe one form of the apparatus. The invention herein described relates to improvements to this apparatus which comprises a centrally mounted shaft on which is suspended first and second columns, for rotation about said shaft and the shaft is typically driven to rotate by a motor which is typically located externally of an enclosure for the apparatus. The first and second columns have one or more leads, commonly referred to as "flying leads" and through which the liquid which is to be processed is supplied and from which the rotation of the apparatus allows one or more components.

An interface between the column and the remainder of the apparatus can be sealed and achieved via the use of the flying leads or alternatively a rotational seal assembly can be provided. When rotational seals are provided, the rotational movement of the components can be asynchronous and when the flying leads are utilised the rotation of the components is synchronous. A known problem is the interface between the column and the flying lead assembly and these problems have prevented the use of various column configurations which may improve component separation and processor efficiency.

It should be appreciated that the invention as herein described includes features which can be incorporated in both synchronous and asynchronous versions of the apparatus.

The known apparatus, while it effectively achieves the separation of one or components from a liquid, operates at a relatively small throughput rate such as, for example, the apparatus can be defined as having a capacity to process 1 litre of liquid in a given time and that is generally accepted as being the throughput rate which is achievable using apparatus of this type. Although there are a combination of reasons why the throughput of the apparatus is limited, attempts to increase the capacity of the apparatus, generally results in an increase in the size of at least some of parts of the apparatus and an increase in the speed of rotation which is required in order for the separation of the at least one component to be possible. This, in turn, requires a greater speed of rotation of the shaft of the apparatus and this is found to cause a significant build-up of heat which, if not managed and reduced, can cause failure of the shaft assembly and drive and/or other parts of the apparatus.

A further problem is that as apparatus is relatively complex so the apparatus is relatively expensive and if the apparatus is not manufactured correctly any repair of the apparatus which is subsequently necessary, is difficult to achieve and may, in fact, cause irreparable damage to the apparatus.

An aim of the present invention is therefore to provide a means whereby the capacity of the apparatus can be increased whilst ensuring that the cooling of the apparatus in use is maintained so as to allow the increased capacity apparatus to perform.

A further aim of the invention is to provide a means whereby the columns of the apparatus are formed in a manner which allows the formation of the same to be simplified and hence reduce subsequent problems and need of repair.

In a first aspect of the invention there is provided centrifuge apparatus including a drive shaft and at least one column provided to be rotated by the shaft around the same, said apparatus further including a flying lead assembly to allow the passage of a liquid introduced into the apparatus and allow the separation of one or more components from the said liquid, wherein connection means are provided for attaching the said flying lead assembly to the said column to allow the flying lead assembly and/or column to be modular.

In one embodiment the modularity of the flying lead assembly and/or column allows the same to be interchangeable, preferably without requiring the remainder of the apparatus to be dismantled and/or requiring the use of tools.

In one embodiment the connecting means is provided in a form so as to maintain the fluid pathway and hence the fluid dynamics between the flying lead assembly and the column to which the same is connected.

In one embodiment the connecting means is range taking inasmuch that the same can be used to achieve connection with a range of columns of different shapes.

In one embodiment the connecting means is reusable and is capable of achieving connection and maintaining a fluid tight seal under high pressure operation.

In one embodiment the connecting means includes an insert part which is located in the liquid pathway.

In one embodiment the insert allows the regulation of the fluid pressure through the connection means via the design of the insert at the time of manufacture to adapt the same with respect to the thickness of the insert.

In one embodiment the said insert is used in one or more further liquid paths of the apparatus to balance the apparatus in use.

Typically the connecting means includes a locking mechanism to lock the connecting means in position for use.

In one embodiment, the columns which are provided have a square, elliptical or rectangular cross-section and may have smooth walls or corrugated or otherwise shaped walls.

In one embodiment the interior of the columns are packed using a perforated plate material.

In one embodiment there is provided a sleeve for the column and a resin material is introduced and located between the inner surface of the sleeve and the outer surface of the column. In one embodiment the cross sectional shape of the column is selected to make available as much of the column to be packed and minimise the use of resin.

In one embodiment a bobbin is provided for use with the column and which allows the column to be formed by winding material which is laid with constant tension to avoid distorting and stretching in plastics material or, if stainless steel is used, to avoid damage and kinking of the tube which will affect the fluid dynamics.

Typically, the use of wound bobbins allows dynamic balancing to be improved as the differences in weight between the same will be minimised.

In one embodiment first and second columns are provided in connection with the shaft and located on opposing sides of the shaft so as to rotate about the longitudinal axis of the said shaft as it is driven to rotate.

In a further aspect of the invention there is provided centrifuge apparatus including a shaft which is driven to rotate about its longitudinal axis and at least first and second columns located on opposing sides of the shaft and attached to but offset from the shaft and rotated about the said longitudinal axis, said columns rotatable about their respective longitudinal axes so as to allow the separation of at least one component from a liquid supplied from flying lead assemblies and connection means to and through the columns and wherein the apparatus includes one or more fan assemblies which are provided to be rotated at least during part of the time in which the said shaft is rotated.

In one embodiment the said fan assemblies are continuously rotated during the rotation of the shaft.

In one embodiment fan assemblies are provided at or adjacent to the shaft and/or columns of the apparatus.

Typically the rotation of the shaft is achieved via a motor connected to the shaft assembly and preferably said motor is located externally of an enclosure in which the said shaft and columns are located so as to avoid the motor generating heat in the said enclosure.

Typically, the one or more fan assemblies are located so as to encourage air to enter from externally of the enclosure and pass through the enclosure as an airflow which provides a cooling effect on the shaft as it is rotated and thereby reduce the heat created by rotation of the shaft.

Typically, the enclosure is shaped with respect to the apparatus parts located within the same so as to encourage the airflow to pass through the apparatus and to the required locations so as to provide the maximum cooling effect.

In one embodiment the enclosure wall, floor and/or ceiling are provided with one or more inlets and/or vents to further encourage the air to flow in a desired path through the enclosure and provide the cooling effect on the shaft.

Specific embodiments of the invention are now described with reference to the accompanying drawings FIG. 1 illustrate a first embodiment of the connecting means of the interface between a column of the centrifuge apparatus and flying lead assembly;

Figure 4:
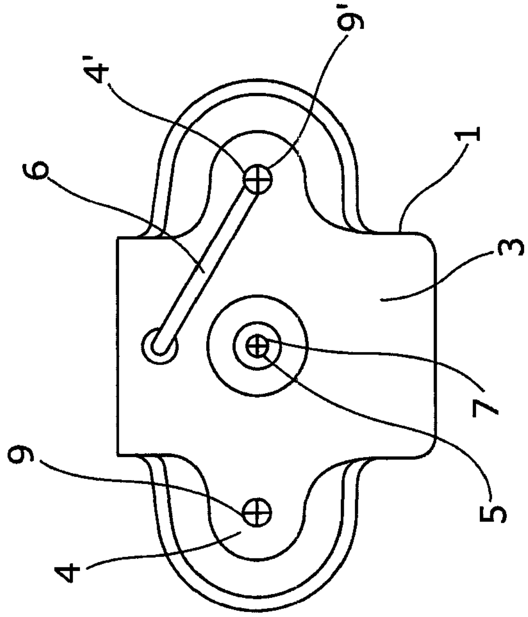
FIG. 4 illustrates centrifuge apparatus in accordance with one embodiment.

FIG. 4 illustrates centrifuge apparatus 1 in accordance with one embodiment in elevation. The apparatus includes a body 3 in which is located a shaft 5 with a longitudinal axis 7 which is connected to a motor which drive the shaft to rotate the same about the longitudinal axis 7.

Located in connection with the shaft 5 are first and second columns 4, 4' which are located so as to rotate with the shaft 5 and which also have their own respective longitudinal axis 9. 9' and the column 4 is also driven to rotate about the axis 9 and the column 4' is driven to rotate about the axis 9'. Liquid is supplied to pass through the respective columns 4, 4' as the rotation occurs in order to allow one or more components to be separated from the liquid. The liquid is supplied to the columns via flying lead assemblies 6, one of which is shown and which include liquid passages or leads therein to allow the liquid to be supplied and extracted from the columns whilst allowing the rotation of the same to occur.

A feature which allows the successful use of the centrifuge apparatus, is the designs of the column 4, 4' configuration and the interface between the flying lead assembly 6 and the column.

In particular, it is desirable to be able to use columns which have a shape other than circular in cross section such as, for example, the use of square/rectangular section extruded tube which would allow an increase in the column capacity and hence increase the capacity of the apparatus. Another possibility is the use of corrugated tube to form the walls of the column and thereby improve mixing efficiency. Other forms of shape could include elliptical extrusions and various cross sectional areas but in each case the common problem is the interface between the flying lead assembly and the column of whatever shape as, in order to transition from the column to the transit flying leads a connection means is required which is fluid tight and resistant to wear.

The connection means, column and/or flying lead assembly in a form which allows the same to be modular inasmuch that the same can be relatively easily separated and replaced without intervention in the remainder of the apparatus and, preferably, with the out the use of tools.

In accordance with the invention there is provided a connecting means which allows these features to be achieved and an example of one embodiment is described with reference to the Figures.

The columns in accordance with the invention can have increased capacity of up to, for example, 20 litres or greater and the same may be formed of selected materials such as aluminium alloys, titanium, other alloys, carbon fibre and/or by using 3D printing techniques.

Figure 1:
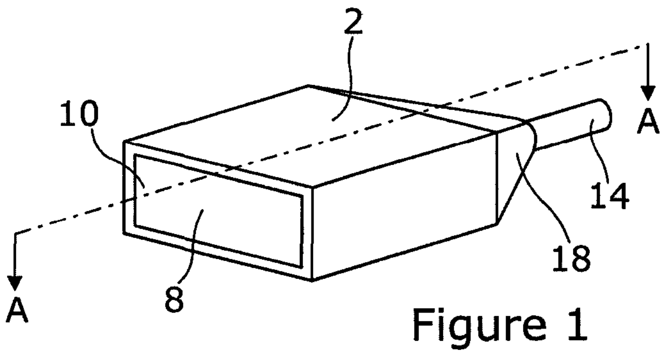
Figure 2:
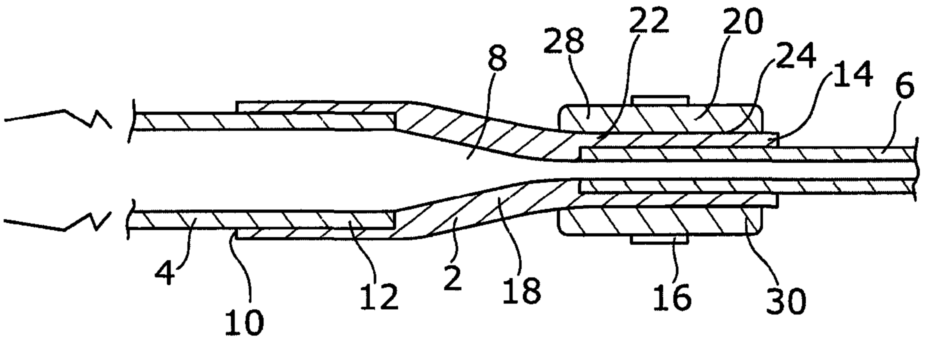
FIG. 2 illustrates a cross section along line AA of the connector of FIG. 1.

In accordance with the embodiment shown in FIGS. 1 and 2 there is illustrated a connecting means 2 for use in the transition between a column 4 of rectangular cross section and a flying lead assembly 6 which is circular in cross section. The connecting means is provided with a channel 8 which allows the passage of fluid there along between the column 4 and flying lead assembly 6 and, at a first end 10, has an engagement formation shaped to receive the end 12 of the column 4 therein. At the opposing end 14 there is an engagement formation shaped to receive the end 16 of the flying lead assembly 6 therein. Intermediate the ends 10,14 there is provided a transition portion 18 which allows the smooth transition between the respective cross sectional shapes whilst minimising the impact on the fluid flow along the channel 8. It should be appreciated that the connecting means can be formed to allow transition between other cross sectional shapes such as from square column to round, corrugated column to round, or elliptical column to round. In addition, or alternatively, the connecting means can be adapted to allow the transition between different materials used to form the column or flying leads such as polymer to stainless steel.

Figure 3:
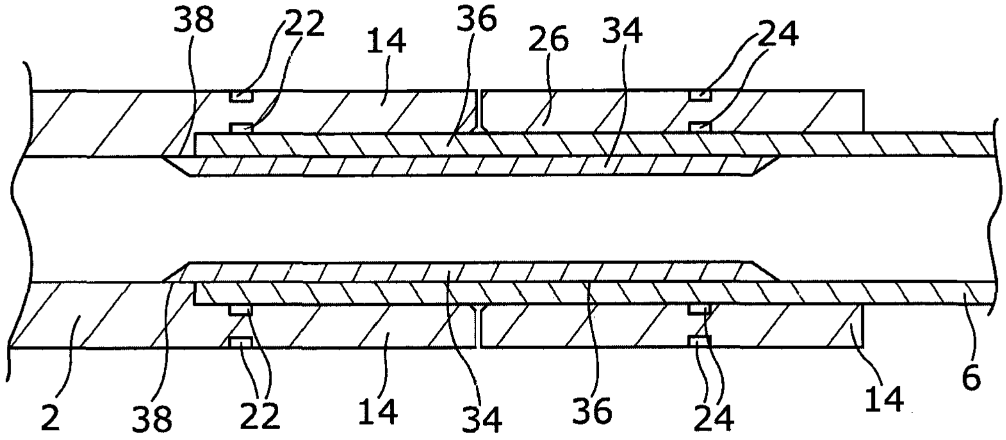
FIG. 3 illustrates a detailed view of the inner components of the connector of FIGS. 1 and 2.

The connecting means 2 is required to allow the secure location of the same with the flying lead assembly 6 and as shown in FIG. 2 this is achieved using a push fit locking means 20 and which is shown in more detail in FIG. 3.

The locking means 20 includes formations 22 on the end 14 of the connecting means 2 and formations 24 on a collar 26 located on the flying lead assembly. First 28 and second 30 outer collars overlie the formations 22, 24 end 14 of the connecting means and collar 26 and act, in combination when engaged together, as the outer securing mechanism for the locking means to retain the same in position in a secure and fluid tight manner. The first and second collars 28, 30 are not shown in FIG. 3 for ease of illustration.

The outer formations 22, 24 respectively receive therein a securing ring which secures the respective parts 14, 26 in position and the inner formations 22, 24 locate on the flying lead assembly 6.

An insert 34 is provided and located around the interior wall 36 of the flying lead assembly 6 and interior wall 38 of the end 14 of the connecting means such that the insert extends along the interface between the parts 14 and 26 to enable the fluid pathway at this interface to be relatively smooth and crevice free in order to avoid disruption to the fluid flow. In addition, the insert can be selectively formed so as to allow the same to act as a regulator with respect to the fluid. For example, if different materials and/or cross sectional formats are used for the column and/or with different volumes and dimensions, the pressure across the column and at the flying lead may be different. Thus, the insert can be used as a means of regulation by forming the same with the appropriate dimensions to standardise the fluid passage up and down stream.

For example, the pressure can be balanced by using different insert dimensions, typically the thickness of the same.

Figure 5:
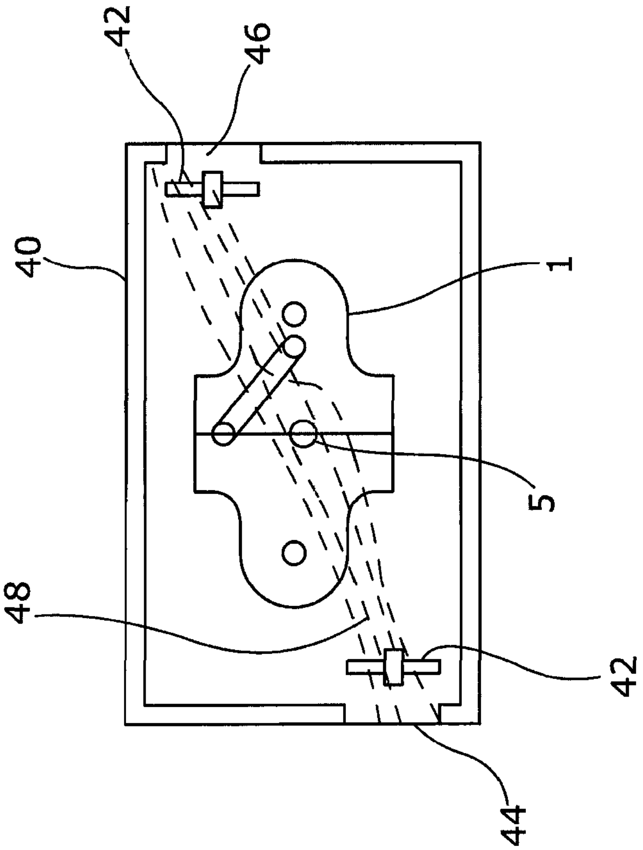
FIG. 5 illustrates an enclosure and air flow paths of the apparatus in accordance with one embodiment of the invention.

In addition to the above features the apparatus can include an air cooling system as illustrated in FIG. 5 in which there is shown an enclosure 40 in which the centrifuge apparatus 1 is located as shown. The enclosure is typically provided with a door which is shut during operation of the centrifuge apparatus and heat can build up during use of the centrifuge apparatus and in particular at the rotating shaft 5. In accordance with this embodiment there are provided fan assemblies 42, in this case two assemblies, which in this embodiment are located adjacent vents 44, 46 in the enclosure 40. The fan assemblies can be selected and located in order to generate an air flow path 48 which is generated and controlled in order to allow the cooling air from externally of the enclosure to enter the enclosure at vent 44 and pass the apparatus and in particular around the shaft 5 to cool the same and then leave the enclosure via vent 46. The number and location of the fan assemblies and vents may be selected in dependence upon the cooling effect which is required and/or the size of housing. In one embodiment there may be provided an external cooled air source in connection with an inlet vent to the enclosure.

The invention claimed is:

1. Centrifuge apparatus including a drive shaft and at least one column provided to be rotated by the shaft around the same, said apparatus further comprising: a flying lead assembly to allow passage of a liquid introduced into the apparatus and allow separation of one or more components from the liquid, connection means are provided for attaching the flying lead assembly to the at least one column to allow the flying lead assembly and/or at least one column to be modular, the connection means form and maintain a liquid pathway for the liquid and liquid dynamics between the flying lead assembly and the at least one column and include a first insert part located in the liquid pathway, wherein one or more further insert part of the same form as the first insert part is used in one or more further respective liquid pathways of the apparatus to form each of the liquid pathways with a same format in use.

2. The apparatus according to claim 1, wherein the flying lead assembly and at least one column are interchangeable with a remainder of the apparatus.

3. The apparatus according to claim 1, wherein the connection means are reusable.

4. The apparatus according to claim 1, wherein the first insert part and the one or more insert parts regulates the liquid pressure as it passes through the connection means.

5. The apparatus according to claim 1, wherein the connection means includes a locking mechanism to lock the connection means when in position for use on the apparatus.

6. The apparatus according to claim 1, wherein the at least one columns are square, elliptical or rectangular in cross-section and have smooth or corrugated side walls.

7. The apparatus according to claim 6, wherein an interior of the at least one column includes a perforated plate material.

8. The apparatus according to claim 1, wherein a sleeve is provided in which the at least one column is received and a resin material is introduced and located between an inner surface of the sleeve and an outer surface of the at least one column.

9. The apparatus according to claim 1, wherein a bobbin is provided for use with the at least one column and allows the at least one column to be formed by winding material in position with respect to the bobbin and with the said winding material held in substantially constant tension.

10. The apparatus according to claim 1, wherein the at least one column comprises a first column and a second column, and the first column and the second column are provided in connection with the drive shaft and located on substantially opposing sides of the drive shaft so as to rotate about a longitudinal axis of the drive shaft as the drive shaft is driven to rotate about the longitudinal axis.

11. The apparatus according to claim 10, wherein said first and second columns are rotatable about their respective axes so as to allow separation of at least one component from the liquid passing through the said first and second columns.

12. The apparatus according to claim 1, wherein the apparatus includes one or more fan assemblies which are provided to be rotated at least during part of a time during which the drive shaft is rotated.

13. The apparatus according to claim 1, wherein rotation of the drive shaft is achieved via a motor connected to the drive shaft via a drive assembly.

14. The apparatus according to claim 13, wherein the motor is located externally of an enclosure in which the drive shaft and the at least one columns are located.

* * * * *